United States Patent [19]
Ahlbrandt

[11] Patent Number: 4,777,557
[45] Date of Patent: Oct. 11, 1988

[54] NEGATIVE PRESSURE CORONA TREATING STATION WITH IMPROVED SEALING MEANS

[76] Inventor: Andreas Ahlbrandt, 17 Uhlandstrasse, Lauterbach, Fed. Rep. of Germany

[21] Appl. No.: 118,716

[22] Filed: Nov. 9, 1987

Related U.S. Application Data

[63] Continuation-in-part of Ser. No. 944,077, Dec. 22, 1986, Pat. No. 4,724,507.

[51] Int. Cl.⁴ .......................................... H01T 19/00
[52] U.S. Cl. ................................... 361/225; 361/230; 427/39; 427/40
[58] Field of Search ............................... 361/212–214, 361/225, 229, 230; 250/324–326; 427/39, 40

[56] References Cited

U.S. PATENT DOCUMENTS

| | | | |
|---|---|---|---|
| 2,844,731 | 7/1958 | Plonsky et al. | 250/324 |
| 3,503,859 | 3/1970 | Goncarovs et al. | 204/165 |
| 4,340,926 | 7/1982 | Payne | 361/230 X |
| 4,451,497 | 5/1984 | Dolezalek et al. | 427/39 |
| 4,615,906 | 10/1986 | Kolbe et al. | 427/40 |

FOREIGN PATENT DOCUMENTS

| | | |
|---|---|---|
| 1489001 | 6/1969 | Fed. Rep. of Germany ...... 361/225 |
| 7307043 | 7/1973 | Fed. Rep. of Germany . |
| 7328009 | 11/1973 | Fed. Rep. of Germany . |
| 2550810 | 5/1977 | Fed. Rep. of Germany . |
| 3302161 | 1/1983 | Fed. Rep. of Germany . |
| 3416405 | 5/1984 | Fed. Rep. of Germany . |

Primary Examiner—L. T. Hix
Assistant Examiner—D. Rutledge
Attorney, Agent, or Firm—Quarles & Brady

[57] ABSTRACT

A device for the continuous treatment of surfaces of thin sheet material (24) includes a treatment roller (7) arranged in a treatment chamber (1) operated at a reduced pressure. A pair of guide rollers (17) and (18) guide a web to be treated through the chamber (1). Each guide roller is sealed by a sealing unit (22) and (23) to provide greater pressure reduction inside the chamber. The sealing units are hollow, with vacuum ports (27) exposed to the sealing surface (26) formed with the guide rollers (17) and (18). A corona electrode (14) is arranged in the wall of this treatment chamber (1) in such a manner that its insulation (15) forms one part of the wall, but the high voltage element (16) of the corona electrode (14) is located outside of the treatment chamber.

8 Claims, 1 Drawing Sheet

U.S. Patent  Oct. 11, 1988  4,777,557

NEGATIVE PRESSURE CORONA TREATING STATION WITH IMPROVED SEALING MEANS

CROSS REFERENCE TO RELATED APPLICATION

This application is a continuation-in part of U.S. patent application Ser. No. 944,077, filed Dec. 22, 1986 now U.S. Pat. No. 4,724,507. entitled DEVICE FOR THE CONTINUOUS TREATMENT OF SURFACES.

BACKGROUND OF THE INVENTION

The invention relates to a device for the continuous treatment of the surfaces of thin sheet material, hereinafter referred to as a web by means of an electrical corona discharge. In such devices, a treatment roller for guiding the web is arranged in a partially evacuated treatment space. The web is closely guided into the treatment space between one pair of rollers and out of the treatment space between another pair of rollers. At least one corona electrode is positioned opposite the treatment roller and is composed of insulation and a high voltage element. Such a device is described in German Publication DE-OS No. 31 34 615.

Recently, it has been determined that the corona treatment in a slightly evacuated treatment space entails great advantages as compared to the use of normal atmospheric pressure. In that case, the corona develops at low voltage, so that the energy consumption and the formation of ozone are reduced. The latter is significant with respect to protection of the environment.

The lower voltage level results in the fact that the web leaving the device is electrostatically charged to a lesser extent. This leads to improved adhesion and wetting characteristics for the web, which is a great advantage for webs which serve as photographic carrier material.

In prior corona treating chambers in which the treatment area is to be evacuated, it is necessary to provide a seal around the guide rollers which feed the web into the chamber. The seal is typically a concave member conforming to the guide rollers which is located close enough to the guide rollers to restrict the entrance of air into the chamber. This type of seal is generally satisfactory for slight pressure reductions, but is incapable of supporting higher levels of vacuum inside the chamber.

The device according to the above mentioned German Publication DE-OS No. 31 34 615 features a corona electrode inside the treatment chamber. When high voltage is applied, the corona electrode not only discharges in the direction of the treatment roller, but also in other directions, especially toward the walls of the treatment chamber. This is especially true for the high voltage wire which must be led into the treatment chamber to supply the corona electrode. This discharge into non-desired directions leads to energy loss and reduces the quality of the treatment on the web.

Aside from this, the previously known device is constructed in a relatively costly fashion, since it not only has discharge electrodes within the treatment chamber, but the feed and exit of the web is accomplished by means of two pairs of rollers through an antechamber and additionally two guide rollers underneath the treatment roller.

SUMMARY OF THE INVENTION

An important aspect of this invention is to provide a greater reduction of pressure inside the chamber 1. This is accomplished in the present invention using a hollow, evacuated sealing unit with one or more vacuum ports. The sealing unit has one concave wall which conforms to the shape of a guide roller. The vacuum ports are positioned on the concave wall of the sealing unit, exposing the sealing surface to the evacuated interior of the sealing unit, thereby reducing the amount of air leaking past the sealing unit into the treatment chamber.

Another object of the invention is to design a device of the type mentioned in the background of the invention above so that it can be constructed in the simplest fashion and with a directed corona which can be aimed to the greatest degree exclusively onto the web which is to be treated.

This object is accomplished according to the invention in that the discharge electrode along with its insulation forms a part of the wall of the treatment chamber and the high voltage element of the discharge electrode is located outside of the treatment chamber.

As a result of this design the discharge electrode discharges into the treatment chamber in a direction towards the treatment roller. This corona discharge which is directed onto the treatment roller results not only from the fact that the treatment roller is connected to a potential which is opposite of the discharge electrode, but also because of the fact that the treatment chamber is operated with reduced pressure, which is favorable for the development of the corona.

Since the high voltage element of the discharge electrode and correspondingly the high voltage lead wires are both located outside of the treatment chamber, where normal pressure prevails, a corona discharge there is not possible. Because of this principle of construction according to the invention, the corona treatment device is simplified as compared to that which was previously known and leads to improved treatment results with less energy consumption.

For threading the web and for inspection of the device it is advantageous for the discharge electrode to be provided in a lid on the treatment chamber which can be opened upwards.

It is especially simple to open the treatment chamber for the purpose of inserting the web if it is composed of two chamber halves, each chamber half starting at one side of the treatment roller and extending to the middle. Each chamber half also includes a discharge electrode positioned opposite the treatment roller. The chamber halves are constructed so as to be separable toward both sides of the treatment roller thus completely exposing the roller.

The device is simplified to a great extent in comparison to the previously known device according to German Publication DE-OS No. 31 34 615 if underneath the treatment roller, two guide rollers are provided which are parallel to the axis of the treatment roller. The two guide rollers have a minimal clearance between themselves, between which the in-going and out-going foil is guided.

A sealing roller is provided underneath the two guide rollers. The sealing roller is parallel to the axes of the guide rollers and exactly between them for sealing the space between the in-going and out-going web. As a result of this design, a total of only three rollers are needed for the feed and exit of the web. Since the guide rollers are arranged underneath the treatment rollers, a sufficiently broad wrap-around of the treatment roller by the web which is to be treated results.

In order to accommodate webs of variable thickness and to make the threading of the web easier, it is advantageous to have the sealing roller arranged in an adjustable manner within limits along a center line which passes through the center of the treatment roller and between the guide rollers.

A proper gusset seal between both guide rollers is especially easy to achieve if the sealing roller has a surface which is elastically deformable in a radial direction.

By the arrangement of both guide rollers and the sealing roller, a result is achieved whereby the sealing roller can pull the web into the device and also extract the web from the device. It is therefore sufficient to have a single drive for the sealing roller.

It is nevertheless advantageous, particularly for thin webs, if, according to another design of the invention, the sealing roller and both guide rollers are driven by means of three gears which mesh with each other in order to prevent friction or the development of creases.

The walls of the treatment chamber can extend close to the treatment roller if the part of the wall of the treatment chamber surrounding the treatment roller is composed of an insulating material.

The invention lends itself to numerous embodiments. One of these is schematically represented in the drawing and is described in the following.

DESCRIPTION OF THE PREFERRED EMBODIMENT

Figure 1:
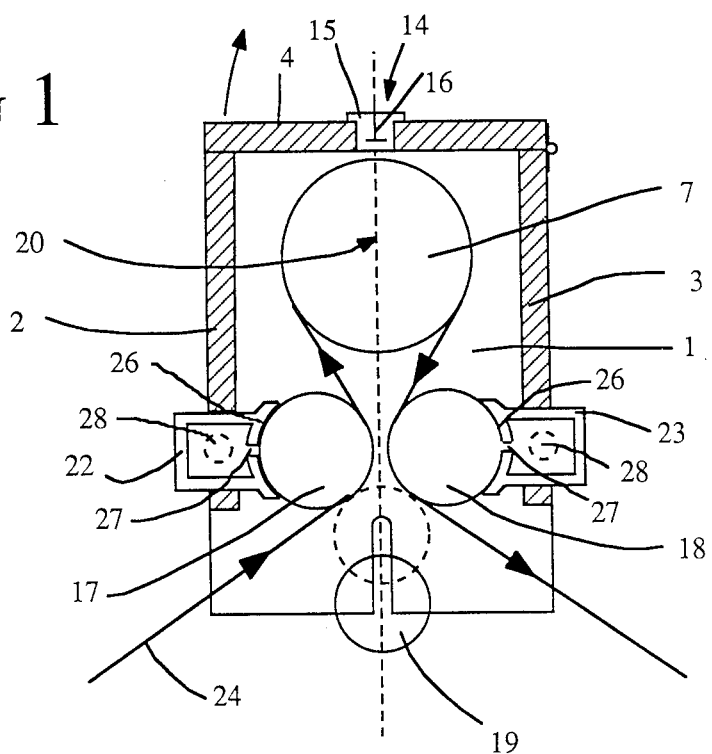
FIG. 1 is a cross section through a corona treatment chamber according to the invention.
Figure 2:
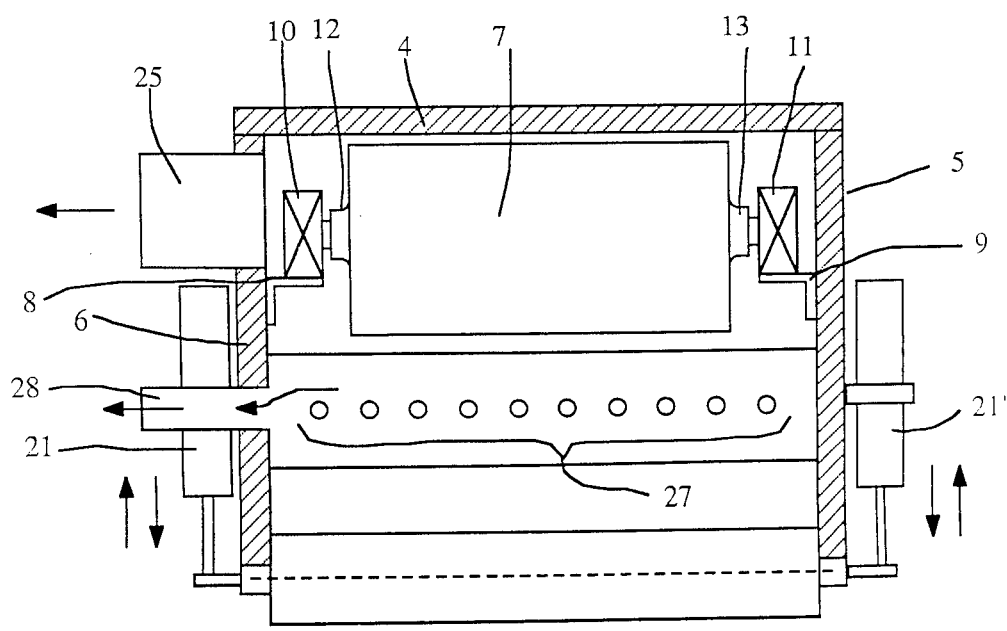
FIG. 2 is a longitudinal section through the corona treatment chamber of FIG. 1.

Referring to FIGS. 1 and 2, a corona treatment chamber 1 is composed of two side walls 2 and 3, a lid 4 and front walls 5 and 6. These side walls 2 and 3, front walls 5 and 6 and the lid 4 are made of an insulating material. On the inside of the treatment chamber 1 there is a treatment roller 7 which is rotatably mounted. A pair of brackets 8 and 9 are fastened inside of the chamber 1 on the front walls 5 and 6. A pair of bearing blocks 10 and 11 are mounted on the brackets 8 and 9, respectively, and each bearing block 10 and 11 receives and supports a journal 12 and 13, respectively, of the treatment roller 7. Of course, the treatment roller 7 with its journals 12 and 13 could also penetrate the front walls 5 and 6 and be supported outside of the treatment chamber 1. Also shown in FIG. 2 is an air suctioning nozzle 25, by means of which air can be suctioned from the treatment chamber 1 for generating a partial vacuum.

Referring to FIG. 1, a discharge electrode 14 is arranged in the lid 4 and is positioned opposite the treatment roller 7. The electrode 14 consists of insulation 15 and a high voltage element 16. An important aspect of this invention is the fact that a portion of the insulation 15 forms part of the lid 4 of the treatment chamber 1.

The bottom of the treatment chamber 1 is bordered by two guide rollers 17 and 18 and a sealing roller 19. All of the rollers 17, 18, and 19 are parallel with each other. The sealing roller 19 is located exactly on a center line 20, which extends from the middle of the treatment roller 7 and between the guide rollers 17 and 18. The sealing roller 19 is shiftable within limits on this center line 20 by the action of two lifting cylinders 21.

Referring again to FIG. 1, the guide rollers 17 and 18 are sealed on one part of their surfaces by means of sealing units 22 and 23 which extend through the side walls 2 and 3, respectively. Front wall means for sealing are provided as well known in the art, although not explicitly shown.

The sealing units 22 and 23 consist of a hollow, generally rectangularly shaped body with one concave side which forms a sealing surface 26 conforming to their respective guide rollers 17 and 18. The concave side of each sealing unit 22 and 23 includes a plurality of evenly spaced vacuum ports 27, exposing the hollow interior of the sealing units 22 and 23 to the sealing surfaces of their respective guide rollers 17 and 18. Each sealing unit 22 and 23 also includes a nozzle 28 for suctioning air out of the interior of the sealing units 22 and 23.

The effect of the vacuum ports 27 exposing the sealing surface to the evacuated interior of the sealing units 22 and 23 is that air which would have otherwise leaked past the sealing units 22 and 23 is instead suctioned out through the vacuum ports 27, resulting in a greater pressure reduction in the chamber 1. This lower pressure inside the chamber 1 provides even further benefit to the electrode 14 of this invention, since an even lower voltage can be used without experiencing the detrimental effects of prior electrodes.

Schematically indicated in FIG. 1 is web 24, which is to be treated in the device. The web 24 is fed into the device, as seen coming from the left in FIG. 1, between guide roller 17 and the sealing roller 19. The web 24 then wraps around the treatment roller 7 and leaves the chamber 1 between guide roller 18 and the sealing roller 19.

In another embodiment of the invention (not shown), the treatment chamber consists of two chamber halves where each chamber half contains a discharge electrode and one of the guide rollers 17 and 18. Both chamber halves are constructed so as to be separable in order to insert the web 24 in a particularly simple manner.

The table below is a listing of references used in the drawings:

1. treatment chamber
2. side wall
3. side wall
4. lid
5. front wall
6. front wall
7. treatment roller
8. bracket
9. bracket
10. bearing block
11. bearing block
12. journal
13. journal
14. discharge electrode
15. insulation
16. high voltage element
17. guide roller
18. guide roller
19. sealing roller
20. center line
21. lifting cylinder
22. sealing unit
23. sealing unit
24. web
25. air suction nozzle 26. sealing surface
27. vacuum ports
28. sealing unit evacuating nozzle

I claim:

1. A sealing unit for a corona treating chamber of the type which includes at least one guide roller for guiding a web to be treated through the treatment chamber, the sealing unit comprising:

a generally box shaped body having a hollow interior and one wall having a concave shape conforming to the guide roller and positioned adjacent the guide roller forming a sealing surface therewith;

an evacuating nozzle connected through the body into the hollow interior for evacuating the hollow interior of the sealing unit; and at least one vacuum port on the wall of the sealing unit which forms said sealing surface.

2. A device for the continuous treatment of surfaces of webs of thin sheet material by means of electrical corona discharge, comprising:

a partially evacuated treatment chamber;

a treatment roller inside the treatment chamber;

a first guide roller for guiding the web into the treatment chamber;

a second guide roller for guiding the web out of the treatment chamber; and a pair of sealing units, each sealing unit disposed adjacent to one of the first or second guide rollers to define a sealing surface between one wall of each sealing unit and the respective guide roller, each sealing unit being comprised of:

a body having a hollow interior;

an evacuating nozzle connected to the body for evacuating the hollow interior of the sealing unit; and at least one vacuum port on the wall of the sealing unit which forms said sealing surface.

3. The device of claim 2 which includes at least one corona electrode positioned opposite the treatment roller, the corona electrode consisting of a high voltage element disposed within an insulating body, and the corona electrode and its insulating body forming a part of a surface of the treatment chamber;

wherein the high voltage element of the corona electrode is located outside of the treatment chamber.

4. The device of claim 3 in which the corona electrode forms a part of a lid of the treatment chamber which can be opened upward.

5. The device of claim 2 in which the first and second guide rollers are parallel and positioned underneath the treatment roller and parallel to its axis, the first and second guide rollers being positioned relative to each other with minimal clearance; and which further includes:

a sealing roller parallel to the axis of the first and second guide rollers and positioned underneath the first and second guide rollers and exactly between them for sealing the space between the in-going and out-going web in the area of the guide rollers.

6. The device of claim 5 in which the sealing roller is movable within limits along a centerline through the center of the treatment roller and between the first and second guide rollers.

7. The device of claim 5 in which the sealing roller has a surface which is elastically deformable in a radial direction.

8. The device of claim 5 in which the sealing roller is driven.

* * * * *